United States Patent Office 3,033,670
Patented May 8, 1962

3,033,670
PROCESS AND COMPOSITION FOR INHIBITING CORROSION OF METALS
Warren E. Stanford, Pittsburg, Kans., and Ralph D. Miller, Kansas City, Mo., assignors to Spencer Chemical Company, Kansas City, Mo., a corporation of Missouri
No Drawing. Filed Mar. 16, 1959, Ser. No. 799,454
18 Claims. (Cl. 71—59)

This invention relates to the protection of metals from corrosion, and more particularly it relates to a method for inhibiting the corrosion of ferrous and aluminum metals which are in contact with aqueous solutions of nitrogen fertilizers and to nitrogen fertilizer solutions of reduced corrosion to these metals.

A relatively recent development in the field of agricultural chemicals has been the rise in popularity of fertilizer solutions comprising fairly concentrated aqueous solutions of nitrogenous compounds containing little or no free amonia. Solutions of this type have found favor with fertilizer users because of their high nitrogen content, their ease of application, and the fact that they need not be stored in pressure vessels. Such fertilizer solutions typically contain at least 20% and preferably at least about 30% by weight of ammonium nitrate, at least 15% water, and less than 1% free ammonia. Optionally, there may also be included other nitrogen-containing fertilizer compounds, such as urea and sodium nitrate. Solutions of this kind are known to be quite corrosive, particularly to ferrous metals, such as mild and carbon steels, and also somewhat less corrosive to aluminum and its alloys. A problem presented by the use of these solutions, therefore, is that of reducing the corrosion of the containers, commonly made of ferrous metals, in which the solutions are shipped and stored, and of the equipment which is used to apply the solutions.

It has been discovered that the corrosion of ferrous and aluminum metals caused by contact with aqueous solutions of ammonium nitrate containing little or no free ammonia can be inhibited by adding to the solution a small quantity of an inorganic boron compound hereinafter more fully described. The corrosion inhibitors of the invention exhibit a remarkable ability to reduce ferrous and aluminum metal corrosion caused by these solutions to extremely low values. In addition, the inhibitors are inexpensive, readily available, and easily incorporated in the fertilizer solutions.

In accordance with the invention there is incorporated in an aqueous ammonium nitrate solution containing dissolved therein at least 20% and preferably about 30% by weight of ammonium nitrate, at least 15% water, less than 1% free ammonia, and from about 0.01% to about 2%, and preferably about 0.05% to about 1%, of a soluble inorganic boron compound selected from the group consisting of the boric acids, the soluble inorganic borates, and mixtures thereof. Optionally, the solution may contain urea and/or sodium nitrate in any quantity up to the maximum permitted by the concentration limits of the other ingredients given above.

The terminology "the boric acids" is intended to include both orthoboric acid ($H_3BO_3$), and in addition those acids and acidic substances which are derivable, at least theoretically, from orthoboric acid by the addition or subtraction of one or more moles of water, i.e., boric anhydride ($B_2O_3$), metaboric acid ($HBO_2$), perboric acid ($HBO_3$), and pyroboric acid ($H_2B_4O_7$). In addition to the boric acids themselves, the soluble inorganic salts of these acids, preferably the alkali metal and ammonium borates, can also be used. Examples of the inorganic borates which can be used in the invention include borax ($Na_2B_4O_7 \cdot 10H_2O$), sodium metaborate ($NaBO_2$), ammonium hydrogen pyroborate ($NH_4HB_4O_7$), and the compounds corresponding to those given in which sodium or ammonium is replaced with ammonium or potassium.

The inhibition of corrosion to ferrous and aluminum metals which results from the method of the invention is illustrated in the following examples. In these examples and in the appended claims concentrations are given as percentage by weight, based on the total composition.

EXAMPLE 1

In the tests reported below there was used as the nitrogen fertilizer solution a composition containing 44.3% ammonium nitrate, 35.4% urea, and 20.3% water. In portions of this solution were dissolved small quantities of the compounds to be evaluated as corrosion inhibitors. Metal coupons used in these tests were fabricated from ⅛ inch by 1 inch strip cold rolled carbon steel. Pieces of this strip were welded together to form a coupon ⅛ inch by 2 inches by 3 inches in size. The welds were ground flush with the surrounding steel surfaces on both sides of the coupon. The coupons were then sandblasted to "white metal" using silica sand and were immediately stored in a kerosene bath until used. Prior to use in these tests the coupons were cleaned and weighed and then put in contact with the test solution for periods of time between 1 and 2 weeks. At the end of this time the coupons were removed from the solution and the rates of corrosion in mils average penetration per year were determined from the loss of weight of the metal. The results obtained with several corrosion inhibitors of the invention are given in Table I.

*Table I*

| Inhibitor | Concentration, Weight Percent | Penetration, Mils Per Year |
|---|---|---|
| None | | 34 |
| Borax ($Na_2B_4O_7 \cdot 10H_2O$) | 0.05 | 25 |
| | 0.1 | 1 |
| | 0.2 | 1 |
| | 0.3 | 1 |
| | 0.5 | 1 |
| Ammonium hydrogen pyroborate ($NH_4HB_4O_7 \cdot 3H_2O$) | 0.1 | 6 |
| Sodium metaborate ($NaBO_2 \cdot 4H_2O$) | 0.1 | 1 |
| Boric anhydride ($B_2O_3$) | 0.1 | 8 |
| Potassium pyroborate ($K_2B_4O_7 \cdot 5H_2O$) | 0.1 | 1 |

EXAMPLE 2

Tests similar to those of Example 1 were carried out to demonstrate the inhibition of corrosion to aluminum which results from the incorporation of the corrosion inhibitors of the invention in nitrogen fertilizer solutions. The test solution of Example 1 was used containing therein varying amounts of borax. Coupons of sandblasted aluminum, type H-14, about ⅛" by 2" by 3" in size were used. These were kept in contact with the solution for a period of 1 week. The results are given in Table II as the observed losses in weight of the coupons.

*Table II*

| Inhibitor | Concentration, Weight Percent | Loss in Weight, Milligrams |
|---|---|---|
| None | | 4.1 |
| Borax ($Na_2B_4O_7 \cdot 10H_2O$) | 0.1 | 1.8 |
| | 0.2 | 1.1 |
| | 0.3 | 1.6 |
| | 0.5 | 2.9 |

The inhibition of the corrosion of aluminum demonstrated by the data of Table II is unexpected in view of the fact that aqueous solutions of borates are known to be more corrosive to aluminum than is water alone. However, within the concentrations specified for use in the invention, the additives disclosed herein not only do not increase the corrosiveness of the nitrogen solutions to aluminum but rather substantially reduce this corrosiveness.

The term "aluminum metals" as used herein and in the appended claims is intended to include not only substantially pure (over 99%) aluminum, but also the alloys of aluminum consisting of a major proportion of aluminum with minor proportions of various alloying elements such as silicon, magnesium, chromium, manganese and the like.

The addition of free ammonia to fertilizer solutions such as those of the invention is known to increase the corrosiveness of the solution toward ferrous metals. For this reason and for the additional reason that the presence of appreciable free ammonia requires storage under pressure, the compositions of the invention are limited to those which contain not more than about 1% by weight of free ammonia.

The foregoing detailed description has been given for clearness of understanding only, and no unnecessary limitations should be understood therefrom, as modifications will be obvious to those skilled in the art.

What is claimed is:

1. A liquid fertilizer composition of reduced corrosiveness to ferrous and aluminum metals comprising a solution containing at least about 20% ammonium nitrate, at least about 15% water, less than about 1% free ammonia, and about 0.01% to 2% by weight of a boron compound selected from the group consisting of the boric acids, the alkali metal and ammonium borates, and mixtures thereof.

2. The composition of claim 1 which includes urea as an additional ingredient.

3. The composition of claim 1 which contains about 0.05% to 1% by weight of said boron compound.

4. The composition of claim 1 in which said boron compound is an alkali metal borate.

5. The composition of claim 1 in which said boron compound is borax.

6. The composition of claim 1 in which said boron compound is potassium pyroborate.

7. The composition of calim 1 in which said boron compound is an ammonium borate.

8. The composition of claim 1 in which said boron compound is ammonium hydrogen pyroborate.

9. The composition of claim 1 in which said boron compound is sodium metaborate.

10. The method of inhibiting the corrosiveness to ferrous and aluminum metals of an aqueous solution of ammonium nitrate, said solution containing at least about 20% ammonium nitrate, at least about 15% water, and not more than about 1% free ammonia, which method comprises dissolving in said solution about 0.01% to 2% by weight of a soluble boron compound selected from the group consisting of the boric acids, the alkali metal and ammonium borates, and mixtures thereof.

11. The method of claim 10 in which said solution contains urea as an additional ingredient.

12. The method of claim 10 in which said solution contains about 0.05% to 1% by weight of said boron compound.

13. The method of claim 10 in which said boron compound is an alkali metal borate.

14. The method of claim 10 in which said boron compound is borax.

15. The method of claim 10 in which said boron compound is potassium pyroborate.

16. The method of claim 10 in which said boron compound is an ammonium borate.

17. The method of claim 10 in which said boron compound is ammonium hydrogen pyroborate.

18. The method of claim 10 in which said boron compound is sodium metaborate.

References Cited in the file of this patent

UNITED STATES PATENTS

| | | |
|---|---|---|
| 2,566,924 | Burghart | Sept. 4, 1951 |
| 2,770,538 | Vierling | Nov. 13, 1956 |
| 2,815,328 | Green et al. | Dec. 3, 1957 |
| 2,855,286 | Harvey | Oct. 7, 1958 |
| 2,983,688 | Marsh et al. | May 9, 1961 |

OTHER REFERENCES

"Bibliography of the Literature on the Minor Elements and Their Relation to Plant and Animal Nutrition," 4th ed., vol. 1, compiled and published by the Chilean Nitrate Education Bureau, Inc., N.Y., 1948, page 142. This publication supplies an abstracted translation of an article originally appearing in Ann. Agr. Suisse 58, 1–36 (1944).